United States Patent
McNelly (10) Patent No.: US 8,153,419 B2
(45) Date of Patent: Apr. 10, 2012

(54) DUAL PURPOSE INTERMODAL AND BIOCONVERSION CONTAINER

(76) Inventor: James J. McNelly, St. Cloud, MN (US)

(*) Notice: Subject to any disclaimer, the term of this patent is extended or adjusted under 35 U.S.C. 154(b) by 1244 days.

(21) Appl. No.: 11/733,180

(22) Filed: Apr. 9, 2007

(65) Prior Publication Data

US 2007/0238166 A1    Oct. 11, 2007

Related U.S. Application Data (60) Provisional application No. 60/744,488, filed on Apr. 7, 2006, provisional application No. 60/803,237, filed on May 25, 2006.

(51) Int. Cl.
  C05F 17/02 (2006.01)
  F26B 25/10 (2006.01)
  B65D 88/74 (2006.01)
  B61D 17/10 (2006.01)
  B61D 17/18 (2006.01)

(52) U.S. Cl. .......... 435/290.1; 435/290.4; 71/9; 34/233; 62/418; 220/1.5; 105/375; 105/423

(58) Field of Classification Search ............... 435/290.1, 435/290.4; 71/9; 34/233; 62/418; 220/1.5; 105/375, 423
See application file for complete search history.

(56) References Cited

U.S. PATENT DOCUMENTS

| | | | |
|---|---|---|---|
| 869,327 A | 10/1907 | Park | |
| 1,942,162 A * | 1/1934 | Campbell | 428/74 |
| 1,980,244 A | 11/1934 | Arthur | |
| 2,696,086 A * | 12/1954 | Jones | 62/65 |
| 2,734,803 A | 2/1956 | Ruskin | |
| 3,092,220 A * | 6/1963 | Black | 52/302.3 |
| 3,301,200 A | 1/1967 | Landsiedel | |
| 3,357,812 A | 12/1967 | Snell | |
| 3,916,987 A | 11/1975 | Giansante | |
| 3,973,684 A * | 8/1976 | Di Martino | 206/512 |
| 4,046,689 A | 9/1977 | Argyll | |
| 4,062,770 A | 12/1977 | Kneer | |
| 4,139,640 A | 2/1979 | Kipp, Jr. | |
| 4,161,426 A | 7/1979 | Kneer | |

(Continued)

FOREIGN PATENT DOCUMENTS

AU    2003270945 A1 *    7/2004

(Continued)

*Primary Examiner* — William H Beisner
(74) *Attorney, Agent, or Firm* — Albert W. Watkins (57) ABSTRACT

An Intermodal container, also known as an ISO Ocean Freight Container is suitable for the dual purposes of biocontainment and also Intermodal shipping. Provision is made for the introduction of water, oxygen or other liquids or gasses to be treated into the container, for exit of liquids or gasses generated or converted in the container, and for the monitoring of biological processes occurring within the container, all in a liquid impervious container. Improved air ducts and flow paths are provided, while the effects of shrinkage and channeling are reduced, through a strategically placed and relative percentage of openings through the floor. Further improvements in air distribution are achieved by an elimination or substantial reduction in percentage of opening through the floor in areas immediately adjacent to the container side walls. The flooring incorporates a self-cleaning hole design which increases in diameter with increasing distance from the container contents. The increases in diameter may be achieved either through smooth and continuous increases, or through discontinuous increments, though the objective regardless of the approach is to ensure that the holes do not clog either when the container is filled with matter, or when vibrated and jolted during handling and transport.

21 Claims, 8 Drawing Sheets

U.S. PATENT DOCUMENTS

| | | | |
|---|---|---|---|
| 4,255,389 A | 3/1981 | Jung et al. | |
| 4,272,489 A | 6/1981 | Lutz et al. | |
| 4,274,838 A | 6/1981 | Dale et al. | |
| 4,302,236 A | 11/1981 | Roman | |
| 4,326,874 A | 4/1982 | Buerklin | |
| 4,339,265 A | 7/1982 | Engelmann | |
| 4,374,804 A | 2/1983 | Easter, II | |
| 4,384,877 A | 5/1983 | Nemetz | |
| 4,411,682 A | 10/1983 | Brill | |
| 4,414,335 A | 11/1983 | Kipp, Jr. | |
| 4,426,020 A | 1/1984 | Presseau et al. | |
| 4,436,817 A | 3/1984 | Nemetz | |
| 4,483,704 A | 11/1984 | Easter, II | |
| 4,659,472 A | 4/1987 | Nordlund et al. | |
| 4,662,900 A | 5/1987 | Ottengraf | |
| 4,684,468 A | 8/1987 | De | |
| 4,798,802 A | 1/1989 | Ryan | |
| 4,869,877 A | 9/1989 | Sellew et al. | |
| 4,946,108 A | 8/1990 | Koenig et al. | |
| 4,956,002 A | 9/1990 | Egarian | |
| 4,994,245 A | 2/1991 | Murray et al. | |
| 5,023,178 A * | 6/1991 | Schiene et al. | 71/9 |
| 5,028,197 A | 7/1991 | Krein et al. | |
| 5,049,486 A | 9/1991 | Blackwood et al. | |
| 5,071,622 A | 12/1991 | Dunson, Jr. | |
| 5,080,786 A | 1/1992 | De Lima | |
| 5,089,036 A | 2/1992 | Hawes | |
| 5,102,803 A | 4/1992 | Weaver | |
| 5,137,687 A | 8/1992 | Dunson, Jr. | |
| 5,160,707 A | 11/1992 | Murray et al. | |
| 5,175,106 A | 12/1992 | Laurenson, Jr. | |
| 5,190,572 A | 3/1993 | Long | |
| 5,206,173 A | 4/1993 | Finn | |
| 5,248,612 A | 9/1993 | Johnson | |
| 5,275,733 A | 1/1994 | Burnham | |
| 5,312,754 A | 5/1994 | Bryan-Brown | |
| 5,340,376 A | 8/1994 | Cunningham | |
| 5,354,349 A | 10/1994 | Inoue | |
| 5,387,036 A | 2/1995 | Hagen et al. | |
| 5,395,417 A | 3/1995 | Thomas | |
| 5,407,809 A | 4/1995 | Finn | |
| 5,409,831 A | 4/1995 | Wright | |
| 5,409,834 A | 4/1995 | Birdwell | |
| 5,413,934 A | 5/1995 | Fischer | |
| 5,417,736 A | 5/1995 | Meyer | |
| 5,417,861 A | 5/1995 | Burnham | |
| 5,459,071 A | 10/1995 | Finn | |
| 5,534,437 A | 7/1996 | Arrau | |
| 5,551,969 A | 9/1996 | Wright | |
| 5,567,220 A | 10/1996 | Thorpe et al. | |
| 5,584,904 A | 12/1996 | Dalos | |
| 5,597,732 A | 1/1997 | Bryan-Brown | |
| 5,609,001 A * | 3/1997 | Pantaloni et al. | 52/506.02 |
| 5,846,815 A | 12/1998 | Wright | |
| 5,869,327 A | 2/1999 | Grabbe et al. | |
| 5,906,436 A | 5/1999 | Cole et al. | |
| 5,925,561 A | 7/1999 | Posselius, Jr. et al. | |
| 6,085,470 A * | 7/2000 | Bigelow | 52/90.1 |
| 6,117,671 A | 9/2000 | Yilmaz | |
| 6,164,142 A | 12/2000 | Dimeff | |
| 6,281,001 B1 | 8/2001 | McNelly | |
| 6,524,848 B2 | 2/2003 | McNelly | |
| 6,627,434 B1 | 9/2003 | McNelly | |
| 7,018,831 B2 * | 3/2006 | Gitt | 435/290.1 |
| 2007/0238166 A1 | 10/2007 | McNelly | |

FOREIGN PATENT DOCUMENTS

| | | |
|---|---|---|
| CH | 679644 A5 | 3/1992 |
| DE | 19643142 C1 * | 12/1997 |
| EP | 131319 A1 | 1/1985 |
| EP | 445102 A1 | 9/1991 |
| EP | 506139 A1 | 9/1992 |
| FR | 2701257 A1 | 8/1994 |
| GB | 435380 A1 | 9/1935 |
| TW | 284966 | 1/1996 |
| WO | WO 9513254 A1 | 5/1995 |

* cited by examiner

DUAL PURPOSE INTERMODAL AND BIOCONVERSION CONTAINER

CROSS REFERENCE TO RELATED APPLICATIONS

This application claims the benefit of U.S. provisional patent application Ser. No. 60/744,488 filed Apr. 7, 2006 and U.S. provisional patent application Ser. No. 60/803,237 filed May 25, 2006, each naming the present inventor, the contents of each which are incorporated herein by reference.

BACKGROUND OF THE INVENTION

1. Field of the Invention

This invention pertains generally to the field of bioconversion, and more particularly to a bioconversion container which may be used for Intermodal cargo transport and alternatively for bioconversion of matter.

2. Description of the Related Art

While landfill space is dwindling or becoming more costly or distant, industrial and municipal waste production is increasing. Furthermore, an ever-increasing variety of materials are developed and introduced into the waste stream. Consequently, the safe disposal of liquid, sludge and solid waste is continually more challenging and complex.

Composting, which, for the purposes of this disclosure will be defined as "the use of living, aerobic and or anaerobic microbial organisms to convert solids and liquids into more environmentally safe and/or beneficial by-products," is a potentially viable alternative to landfills for the disposal of organic materials from nearly all waste streams. Composting can be used, for example, to process municipal wastewater biosolids, to remediate industrial wastewater solids, and to treat wastes and by-products from processing food and agricultural products. Composting can reduce the volume of organic waste materials by 50% or more, yielding a stable, non-odorous material that can be used as fertilizer or as an amendment for soil.

Before about 1970, composting was typically a simple process in which waste materials were piled and allowed to sit until they decomposed. It was most frequently done on a small scale and was not often considered for industrial-scale problems. Grinding the material to be composted was considered advanced technology.

An advance in composting technology came from the realization that adding air to the composting mixture could increase the efficiency of composting. The microbes that produce compost require air and will smother inside of a static unaerated pile. Hence, the initial methods of aeration involved moving or agitating the compost to allow air into the stack.

A typical example of this aeration is a windrow turner that picks up the compost and dumps it to one side. Many municipal composting sites are currently windrow turner operations, though process control is, unfortunately, quite primitive. Piles are typically turned at the convenience of the operator, rather than to optimize the composting process. A typical pile of compost will use all of its oxygen within about one-half hour, so such windrow turning is seldom related to actual oxygen demand. Turning is done seldom enough that microbes in the center of the pile are rapidly depleted, and the center of the pile stops composting. Turning the pile merely re-inoculates the center material with fresh microbes, and composting continues in the center of the pile for another one-half hour when the oxygen supply is, once again, depleted. Unfortunately, the repeated mechanical actions that are required for turning destroy some beneficial fungi that rely on large, filamentous growth. In addition to the oxygen and mechanical problems introduced by a windrow system, composting with windrow turners is typically done in an open, unsheltered area. The vagaries of weather and rainfall most often determine the water content of the composting mass. When there is too little rain, the pile is too dry. When there is too much rain, the pile is wet and requires frequent turning. Too much rain can also lead to problems with runoff of leachate.

One method used to overcome some of the disadvantages of pile composting is to enclose compost piles in a building. An enclosure that keeps rain off of the compost allows better regulation of water content. However, such a facility is very expensive. Furthermore, with pile composting, various irritating and potentially toxic gases are sometimes produced. Since operators must enter the enclosure to maintain the composting process, enclosing compost also involves maintaining the quality of large volumes of air within the building. Without high-quality and high-quantity air handling systems, the atmosphere within an enclosure can be irritating, if not toxic, to an operator.

Some of the disadvantages of pile composting are overcome by more modern reactor vessel processes. By design, the reactor vessel is typically only slightly larger than the compost which it contains. This reduces the land area required to store the compost during the composting process. In addition to reduced land area, the total volume containing or enclosing the compost is also reduced. Lower total volume means reduced air handling requirements. Furthermore, in-vessel reactors also provide the opportunity for collection of potentially odorous emissions. The compost is enclosed, and exhaust air may be routed through a filtration system. This separation of operator from compost air benefits the health and safety of all operators. There are other benefits, beyond land space and air handling, from reactor vessels. Handling and mixing, which is required in all systems, can also be mechanized using reactor vessels, and the compost is enclosed.

In-vessel systems may be used not only for composting, but also for other bio-conversion processes. Bioconversion describes the conversion of matter using biological processes either wholly or at least in part. While not limited solely thereto, bioconversion includes not only such processes as aerobic and anaerobic composting, but also bio-filtration, bio-remediation and other biological conversions.

While bioconversion processes may be conducted in very small laboratory containers, to be of economic value these processes require large vessels or containers. Nevertheless, these processes are still performed in relatively few locations and so the demand for such vessels or containers is relatively small. Consequently, many artisans have designed custom containers and have fabricated these custom containers in relatively small quantities.

Unfortunately, many vessel systems are complicated systems which require precision construction techniques and permanent, stable foundations. This necessarily drives the cost of reactor vessels systems to levels even higher than required for building-type enclosures. In exemplary prior art systems, organic waste is fed into an opening at one end of the reactor and compost is removed from the other end. The material is moved through the reactor by, for example, a complex moving floor apparatus or hydraulic ram. A cration is sometimes provided by pressurized air forced through the organic waste from air vents located throughout the moving apparatus.

Some in-vessel systems also include mixing systems, typically rotating paddles or prongs, within the compost mass.

Other in-vessel systems are static. The agitation systems used with in-vessel systems are expensive, prone to wear and failure, and provide agitation at intervals that are not readily controlled with respect to the progress of the composting process.

At the present time, bioconversion processes are only marginally cost-effective. For essentially all bioconversion processes, there is at least one mechanical or chemical counterpart, and these mechanical or chemical counterparts often times require less capital or less operating expense. However, many of these mechanical or chemical counterparts are parts of much larger, higher volume systems or operations. As but one example, in the waste disposal industry there are literally millions of roll-offs and Intermodal containers which are produced in factories which have been designed to keep the cost of fabrication at a minimum level. While the bioconversion processes themselves have been optimized to both lower costs and produce valuable products for sale, it has heretofore been very difficult to provide containers which would keep costs competitive with basic roll-offs, Intermodal containers, and landfill garbage handling.

A few artisans have heretofore incorporated garbage roll-off containers and Intermodal shipping containers into the design of bioconversion systems. Exemplary of this are U.S. Pat. Nos. 6,281,001; 6,524,848; and 6,627,434; each by the present inventor and the teachings of each which are incorporated by reference. While the basic containers are then obtained at much more competitive prices, and the handling equipment is in many cases already available, there has still remained a substantial expense in retrofitting these containers.

Figure 4:
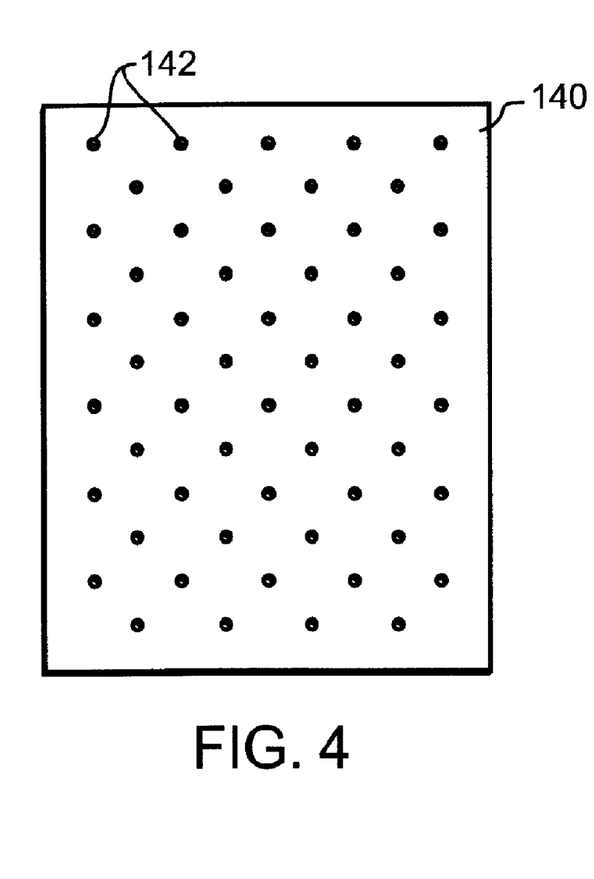
FIG. 4 illustrates a preferred floor panel designed in accord with the teachings of the present invention from top plan view.
Figure 5:
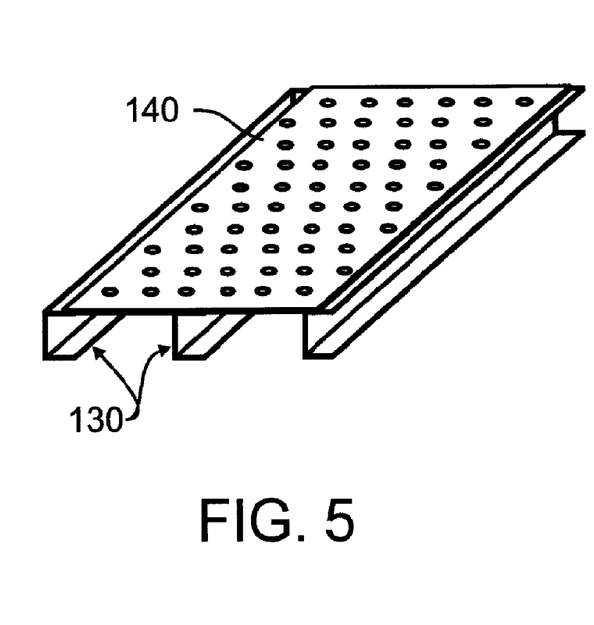
FIG. 5 illustrates the floor panel of FIG. 4 in further combination with a portion of the sub-floor beam framework of FIGS. 1 and 2.

In the prior art, one typical retrofit sequence has been the application of a solid subfloor such as a steel or other plate or layer as a replacement for or on top of the commercial wooden floor, or the application of a sealing coating onto the wooden floor. Next, a set of spacers would be provided along the length of the container, but not extending quite to an inlet end. Onto these spacers would be provided a floor which would typically be a relatively open grating of perforated metal or the like, through which ventilation air would pass up into the container interior, and also through which leachate liquid would pass down from the container interior. At the inlet end of the container, and in the gap between subfloor and floor provided by the spacers, would then be an inlet through which ventilation air would pass. Since the spacers did not extend fully, the inlet air could pass at this end between any of the spacers freely. From the inlet end, the air would then pass along the length of the container, often times forty feet in distance, and at any point along the length would pass through the openings in the floor and into the container interior. To collect the leachate, a drain would be provided at one end of the container, typically adjacent the inlet, and for exemplary purposes formed by enclosing the last two beams to form a reservoir or sump into which the leachate could pool, such as illustrated in FIGS. 4 and 5. Most typically, within the container interior would be organic matter, and the air would be slightly pressurized above ambient to pass interstitially through the organic matter. Undesirably, this retrofit requires substantial on-site labor and additional materials, the combination which substantially increases the cost of a container. In addition, the retrofit container would no longer be compatible for shipping purposes, since the new floor would necessarily be elevated several inches higher than the original floor. In addition, the elevated perforated floor would not support shipping loads.

Furthermore, as the prior art container is elongated even to forty-five and fifty-three foot lengths or more, which helps economically in processing costs, and also even at typical twenty to forty foot lengths, the air distribution through the organic matter becomes undesirably inconsistent. The present inventor has determined that, as distances from the inlet port increase, there is a measured and detrimental decrease in air flow through the mass. The twenty and forty foot lengths are undesirably long.

One area of concern with this prior art approach is the floor of the vessel. In the prior art Intermodal containers, these floors are typically special plywood which is attached onto a channel or beam floor using screws or bolts. The beam supports are commonly open on the bottom side, and a bituminous coating is typically applied to render the flooring relatively water-tight, and thereby compliant with ISO standards.

To render such container useful for bioconversion, the flooring is perforated. This may be done by adding a second "false" floor raised above the wooden flooring as described above, or by directly perforating the wooden floor. The container may then be tilled with biomass, and air introduced into the container through the floor. Leachate will simply drain out through the perforations, and may then be collected for removal. Unfortunately, the wooden floor is not resistant to bioconversion products. Perforations, nail holes and any other surface damage will lead to accelerated decomposition or failure of the floor. This surface damage may simply be a result of the insertion of the biomass, though many other processes are also known to cause surface damage, including the common practice of anchoring cargo within an Intermodal container by nailing the cargo to the container floor.

Once the container floor has been perforated, whether for ventilation or by decay, the floor is not water-tight or air tight. When a false floor is incorporated, there is substantial risk of damage to the original floor, such as accidental ignition during welding. Additionally, the container corrosion resistant coatings are necessarily damaged during installation of the false floor. Finally, the false floor requires internal space, and the container will no longer meet ISO size standards. Whether caused by perforation porosity, decreased dimension, or container damage, the end result is that containers once converted no longer meet the ISO requirements, may only be useful for bioconversion, and may have undesirably short life expectancy.

Not only has prior art conversion permanently altered the use of a container and jeopardized the container integrity, such conversion has also involved many hours of high-cost labor often provided directly at a job site. Consequently, it has heretofore been impossible to achieve the cost benefits that are associated with factory production. This has, in turn, driven the capital costs of installing a bioconversion system higher than desired.

Another cost associated with the prior art has been the biological processing time desired for the bioconversion process. Composting processes such as those described by the present inventor in the patents incorporated herein above by reference, which are among the most rapid in the industry, still require two to three weeks for an initial high temperature phase of composting to occur. There may be an additional curing period that may last two to three months. During this period, the container is being used and has heretofore been unavailable for other benefit or value. As a result, there remains a need for an improved and economical bioconversion container which is convenient, low-cost, efficient, and scalable.

SUMMARY OF THE INVENTION

In a first manifestation, the invention is an Intermodal container suitable for both shipping and bioconversion container, comprising a subchassis having a subframe defining a length, width and height, a top and bottom spaced by the height. The subframe has ventilation and drainage holes passing through a subframe exterior. Beams extend laterally within the subframe across the width. The beams have holes through which ventilation and drainage may pass. A subfloor is sealed with and adjacent to the bottom of the subchassis A perforated floor is adjacent the top of the subchassis.

In a second manifestation, the invention is a method of converting an Intermodal container to an Intermodal container suitable for both shipping and bioconversion container. According to the method, suitable ventilation and drainage holes are formed in a subchassis. A floor adjacent a first surface of the subchassis is perforated. A subfloor is coupled adjacent to a second surface of the subchassis distal to the first surface.

In a third manifestation, the invention is a bioconversion container having replaceable smooth side walls.

In a fourth manifestation, the invention is an array of Intermodal containers each separately forming liquid tight containers. Means are provided for coupling ones of the array to others. Ventilation is provided into ones of the containers. The containers are oriented with an opening into each container elevated, and the liquid tight container situated beneath the opening, suitable for containing bio-matter.

OBJECTS OF THE INVENTION

Exemplary embodiments of the present invention solve inadequacies of the prior art by providing a modified subchassis and subfloor, and a replacement floor to a prior art Intermodal container. Specially tapered perforations are formed in the replacement floor. Depending upon the application, special side walls may be provided, with or without additional thermal insulation. The modifications in accord with the invention may be provided as a retrofit to existing commercial ISO standard Intermodal containers, or may be made during fabrication of the container. The novel containers to be useful for both bioconversion and Intermodal cargo shipment.

A first object of the invention is to modify a container in a way which complies with ISO standards for Intermodal containers, to permit the container to be used for both bioconversion and as an ISO standard Intermodal container. A second object of the invention is to provide a perforated floor within the container which comprises self-cleaning holes. Another object of the present invention is to ensure adequate and even air distribution throughout the container, when containing biomass. A further object of the invention is to reduce the percentage of perforation openings required. Yet another object of the present invention is to provide flooring which permits loaders and scrapers to add or remove material directly therefrom, without damaging the flooring or perforations.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which:

FIG. 11 illustrates a first embodiment insulated wall designed in accord with the teachings of the present invention, while FIG. 12 illustrates a second embodiment insulated wall from similar partial sectional view.

DESCRIPTION OF THE PREFERRED EMBODIMENT

Manifested in the preferred embodiment, the present invention provides an Intermodal container, also known as an ISO Ocean Freight Container, that is suitable for the dual purposes of bio-containment and also Intermodal shipping. Either purpose may be selected by an end-user without structural alteration, while remaining in compliance with all applicable national and international standards. With regard to Intermodal requirements, this means the container must float in water for 24 hours, and that cargo may be nailed to the floor to prevent undesirable motion during handling and transport. For the purposes of the present disclosure, the reviewer will be assumed to be familiar with existing ISO standards and prior art containers, and, if not, is directed herein to the many resources on the same including the ISO standards themselves. With regard to a bio-container, two uses are described though any suitable bioconversion process is contemplated herein. One preferred application is to a semi-solid biomass such as feedstock for composting that may including food production residuals, manure, forest products, and biosolids. The other preferred application is to a liquid or semi-liquid biomass such as wastewater to be treated or semi-liquid wastewater, food processing or manure solids.

Existing Intermodal containers are only marginally watertight. The typical 28 mm plywood floor is made from sheets that are not fully sealed at their joints or against the container wall, enabling water infiltration or leakage. In addition, the typical Intermodal door gasket design is configured to prevent water infiltration, not water containment. A preferred embodiment container designed in accord with the teachings of the present invention will not only prevent water infiltration, but will also keep water and gases in the container, except where intentionally vented or released. In addition, provision must be made for the introduction of water, oxygen or other liquids or gasses to be treated into the container, for exit of liquids or gasses generated or converted in the container, and for the monitoring of biological processes occurring within the container.

Figure 1:
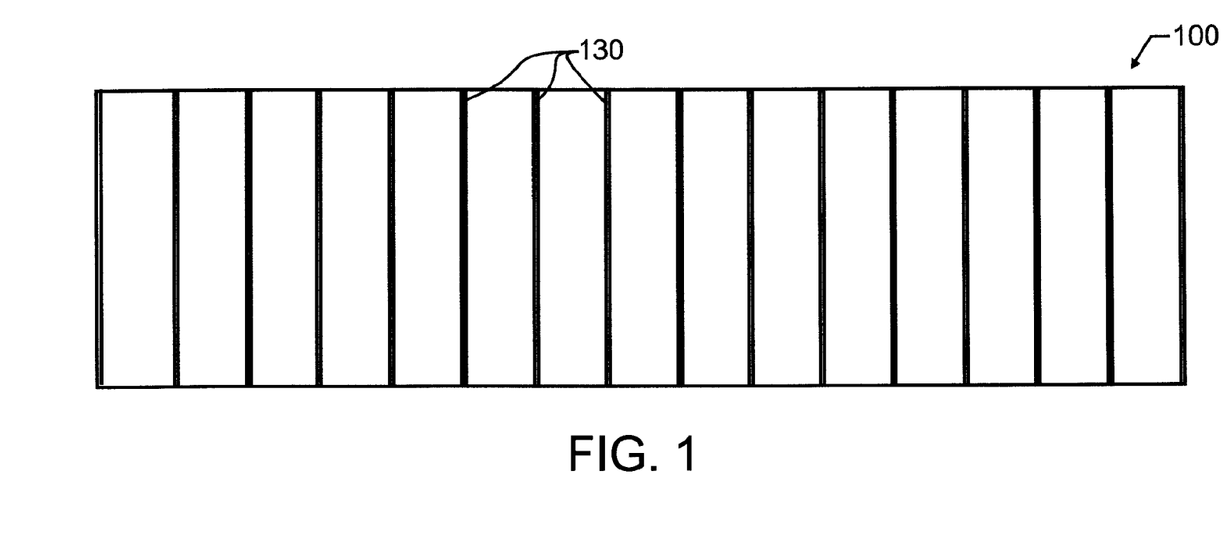
FIG. 1 illustrates a preferred embodiment sub-floor beam framework designed in accord with the teachings of the invention from top plan view.
Figure 2:
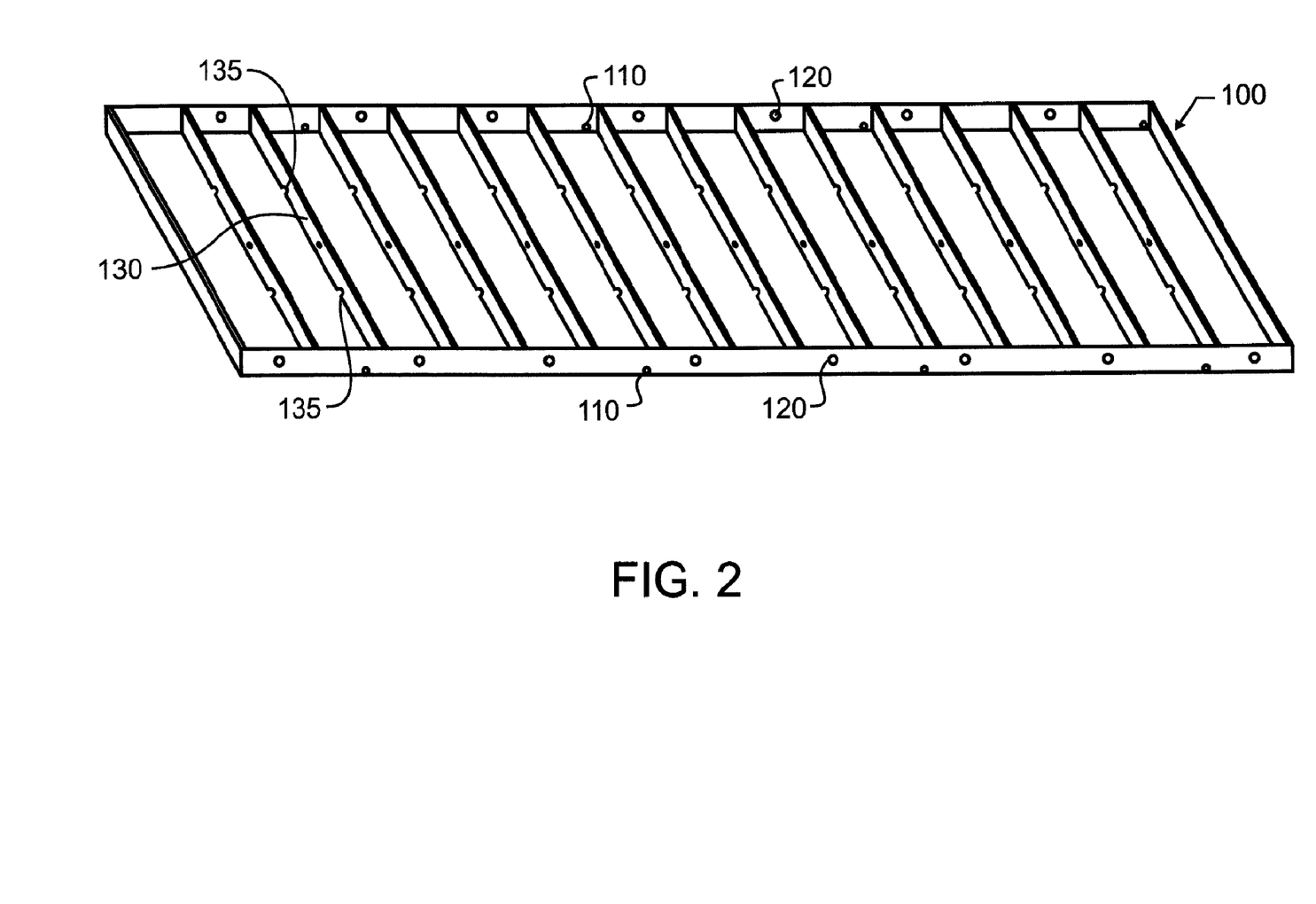
FIG. 2 illustrates the preferred embodiment sub-floor beam framework of FIG. 1 from a projected plan view.
Figure 3:
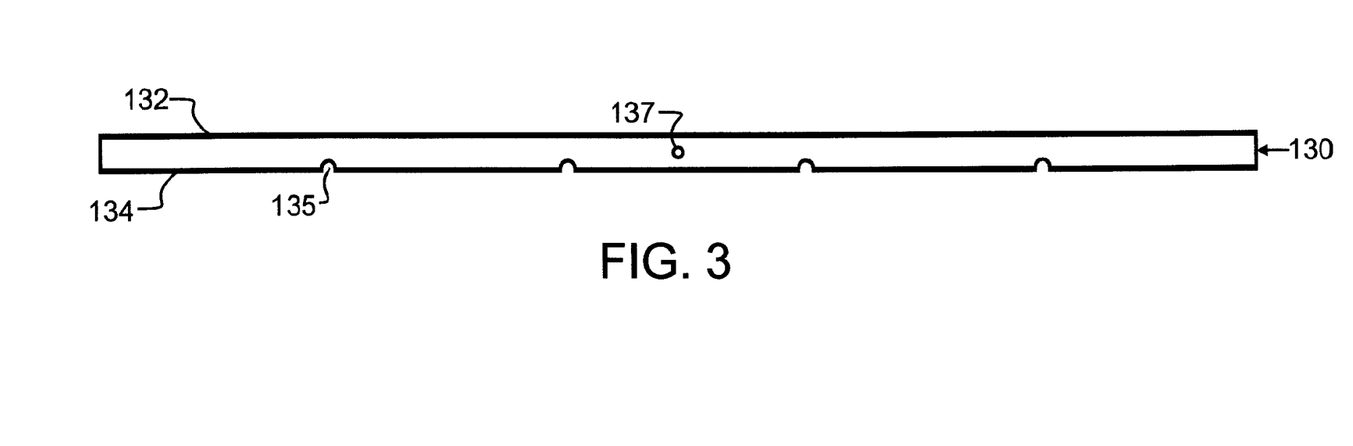
FIG. 3 illustrates one individual beam used in the preferred embodiment sub-floor beam framework of FIG. 1 from front plan view, further showing the individual "mouse holes" or cut-outs that are provided for drainage and ventilation.

In order to overcome the limitations of the prior art, a most preferred embodiment sub-frame 100 designed in accord with the teachings of the present invention is illustrated in FIGS. 1-3. As may be observed therein, the basic structure of the floor may be preserved. Sub-frame 100 may be primarily fabricated using existing equipment. However, additional ventilation holes 137 and "mouse holes" 135 will be provided in C-channels 130.

If required for adequate strength, it is possible to provide either less spacing between C-channels 130, or heavier materials for each individual beam. In practice however, the present modifications may be made without further change in weight or design of C-channels 130. More particularly, as may be seen in FIG. 2, mouse holes 135 are formed near the bottom of the beams. Mouse holes 135, so named for their physical resemblance to cartoon mouse holes, permit the passage of air laterally to the beams, or longitudinally through the container. At the same time, leachate may also pass between. In addition, when arranged in a linear manner as illustrated in FIG. 2, these same mouse holes 135 may be used to insert a spray wand or the like, where a resealable access port of like geometry is provided in the outer sub-frame members. The spray wand may then be used to clean out any debris or residue that might otherwise accumulate within sub-frame 100, simply by inserting a spray wand progressively through each sequential mouse hole, and thoroughly washing.

In addition to mouse holes 135, secondary ventilation holes 137 are provided at a slightly higher elevation within C-channels 130. These secondary ventilation holes 137 assist, in the event that mouse holes 135 become clogged, with the conduction of air throughout sub-frame 100.

In the frame surrounding the beams or C-channels 130, there will most preferably be provided a combination of ventilation holes 120, typically for the inlet of air, and also a set of leachate drain holes 10. Ventilation holes 120 will preferably be provided slightly above drain holes 110, thereby ensuring that any leachate generated drains through the intended outlet and does not foul or otherwise interfere with the inlet. As discussed herein above with regard to the spray wand clean-out access ports, these inlets and outlets will preferably be sealed ports such that when not in use, they are capped against the passage of either gasses or liquids, and that, when in use, a similarly gas and water tight coupling is provided to the associated utility, such as a drain pipe or blower pipe.

The particular number of ventilation holes 120 and leachate drain holes 110 about sub-frame 100 is not as critical to the proper conduction of inlet gas, owing to the presence of mouse holes. As illustrated in FIG. 2, ventilation holes 120 and leachate holes 110 are preferably provided on both sides of the container. However, these holes may, for exemplary purposes, be provided only on one side of the container, thereby leaving every other space between beams serviced only through mouse holes 135. Likewise, it may be desirable to place holes entirely on one side, and into every space between beams. In other instances, it may be desirable to place inlets on one side, and drains on the other. In such case, it may be possible to provide a slight operating tilt to the container, and lower or expand ventilation holes 120 such that they are adjacent the subfloor, similar to drain holes 110. Other suitable combinations, too numerous to specifically mention, will be apparent from the foregoing. Nevertheless, by providing ventilation holes 120 along the side(s) of the container, using the existing beams, the distance from an inlet port is substantially reduced from the prior art twenty to forty feet, thereby improving the consistency of ventilation flow through the container contents.

Alternative flooring material, sub-flooring, and elastomeric gaskets or other suitable seals in the preferred embodiment replace the bituminous coated plywood used in existing Intermodal containers. Bituminous-coated plywood of the prior art keeps the containers only relatively water tight, but repeated exposure to moisture, biologically active agents, and the products of bio-conversion rapidly destroy wood. Furthermore, the need for ventilation in bio-container flooring prevents the flooring from serving as the sole water barrier when the dual purpose container is used as an Intermodal container.

FIG. 4 illustrates the preferred flooring 140, which in the preferred embodiment will be fabricated from polymers, and will preferably be provided with a large number of relatively small perforations 142 extending from one major face to the other. These perforations permit air, condensate and leachate to pass through the flooring. The number, placement and geometry of these perforations is not critical, but will normally take into account the desired flow of matter in either direction. More particularly, the present inventor has recognized that, as biomass is composted, there is a common tendency towards separation of the biomass from container sidewalls. To prevent this type of channeling of air flow from adversely "short-circuiting" proper ventilation and instead passing the air between the side walls and the biomass, the preferred embodiment will most preferably be provided with fewer, if any, perforations 142 adjacent to the container side walls.

Fabrication from adequate material will permit flooring 140 to be used not only for bioconversion, but also for the support and anchoring of freight. Most preferably, flooring 140 will be easily cleaned, such that the container may be used first for bioconversion and then, following a simple cleaning, used for cargo. While plastic such as polypropylene or other suitable material is preferred for the foregoing reasons, the present invention is not so limited. Other materials including composites, coated or stainless steel, or any other suitable materials, whether coated or uncoated and laminated or solid, are also contemplated herein.

As illustrated in FIG. 5, flooring 140 may be fabricated in relatively small tiles, such as a few feet on a side and approximately one to one and one-quarter inches in thickness. This flooring is then sized and comparable to the existing flooring found on many prior art Intermodal containers, but is resistant to degradation by organic acids, microbes and the like that may commonly be found in a bioconversion container. A number of materials are known which would be suitable in the present application, including polyethylene of all densities and molecular weights, polypropylene, polyvinyl chloride (PVC), and many other plastics too numerous to mention. The sizes of tiles used for installation will also be determined at the time of design by a designer, and will take into account availability and prices of different sizes of tiles, as well as equipment already available and laborers already trained for installation. It is commonplace in the industry to provide flooring tiles of different sizes within a container, often times simply to avoid seams that are extensive and which might then weaken the structure.

The flooring tiles 140 are most preferably anchored using stainless steel or equivalent fasteners, to ensure suitable corrosion resistance to the organic acids and the like which are commonly produced or found in bioconversion containers. A square or socketed head fastener will reduce the chances of stripping that might otherwise occur after the container has been used for a bioconversion process.

Figure 6:
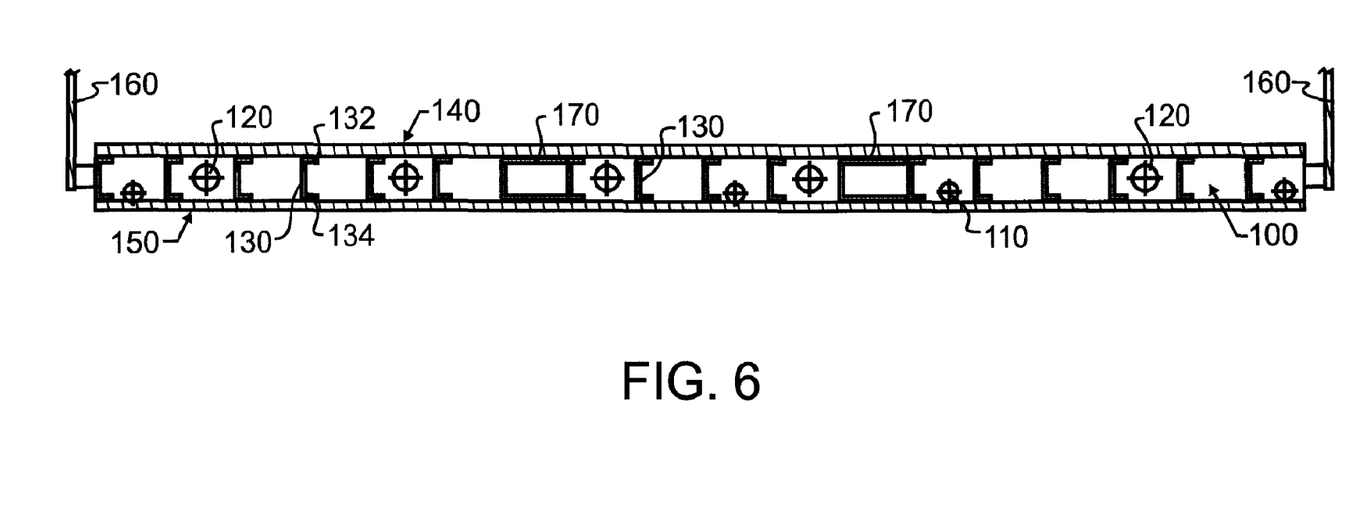
FIG. 6 illustrates the preferred embodiment floor panel of FIG. 4 in further combination with the sub-floor beam framework of FIGS. 1 and 2 from sectional view from an end.
Figure 7:
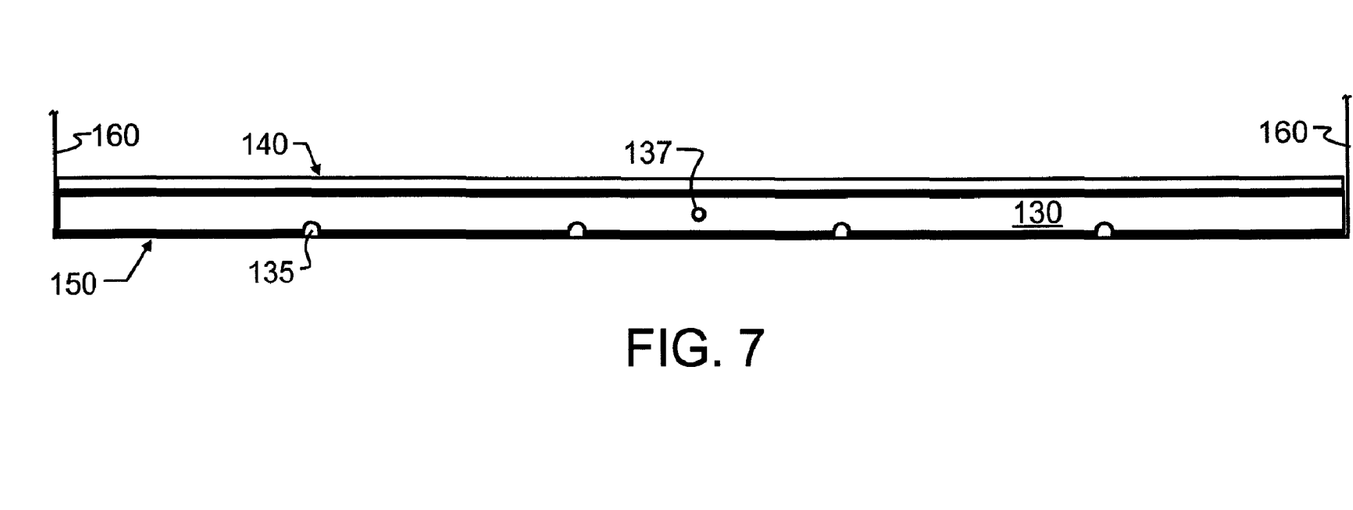
FIG. 7 illustrates the combination of FIG. 6 from side sectional view.

The preferred subchassis, which is comprised primarily by subframe 100, flooring 140, and subfloor 150, is illustrated in FIGS. 6 and 7, by end and side views, respectively. As evident therein, subfloor 150 seals the container against any leakage of either leachate or pressurized ventilation air. Since flooring 140 has relatively small perforations therein, into which some undesirable matter will undoubtedly pass, it will be desirable to make either floor 140 or subfloor 150 removable. This may be achieved by either bolting subfloor 150 to subframe 100, and then providing a gasket for subfloor 150 to achieve the requisite sealing, or providing some other type of seal. Most preferably, the seal selected will be removable and reusable though, since when the container is used for bioconversion there will be occasions where it may be desirable to remove either subfloor 150 for direct access for cleaning. More desirably, subfloor 150 will be welded to subframe 100 to form a water-tight seal therewith, and small tack or spot welds will be used to couple subfloor 150 to C-channel legs 134. By using welds, subfloor 150 will not be removable. Instead, subfloor 150 will become a part of the structural integrity of subframe 100 and the balance of the container, adding substantial strength thereto. Any strength which is lost by the formation of mouse holes 135 and ventilation holes 137 can be more than offset by a properly designed, dimensioned and rigidly attached subfloor 150. Nevertheless, and if so desired, both floor and subfloor may be permanently attached, since in any case cleaning can be effected through ventilation and mouse holes 137, 135.

Structural integrity of a container designed in accord with the present teachings has been improved by introduction of sub-floor 150. Consequently, flooring 140, which in the prior art served as a critical structural component, does not require the large number of fasteners of the prior art. Flooring 140 may therefore in the present invention be removed more readily to permit cleaning of air channels. The reduction in fasteners also results in reduced parts cost and assembly time. The sub-floor 150 may be flat, or alternatively may be corrugated or of other geometry as would be determined by a reasonably skilled designer. In addition, in some cases subfloor 150 may also replace separate bases or railings that are required for some types of containers. Examples are roll-off containers, which require special rails. A suitably designed sub-floor would alleviate the need for such separate failings.

Flooring 140 may be a combination of plastic strips and wooden strips, and is not limited solely to one or the other. For some applications, such as where fork lifts, other wheeled vehicles, and even personnel must traverse the flooring, a combination of flooring materials may offer much advantage. Flooring 140 may also be made from perforated steel, particularly salvaged side walls from other containers, which while may not make the bio-container usable as an ISO container, can still enable it to be used for transportation.

The ventilation mouse holes 135 are aligned to facilitate clean-out. Nevertheless, using the preferred combination of flooring and fasteners, clean-out may also be accomplished by removing the floor. The flooring fasteners are preferably square drive, socketed head or the like to reduce failures from clogging or corrosion that plague Phillips head fasteners.

At the time of fabrication, it may be desirable to provide either knock-outs or threaded holes with plugs in them for each of the ventilation holes 120 and drain holes 110. Knockouts will be understood to be scribes or regions of predefined weakness, which may readily be punched out to form the opening. In such a case, an installer will have the flexibility to select which holes to provide connection through, without additional labor being required. More preferably, removable caps will be provided, such as may be threaded in place or bolted on, to provide for switching the container between Intermodal cargo application and bioconversion application.

Many containers, both Intermodal and otherwise, still provide forklift access points 170 within the containers. These forklift access points 170 are commonly simple boxed off portions of subframe 100 as illustrated in FIG. 6. In order to provide the desired air flow through subframe 100, mouse holes 135 and secondary ventilation holes 137 must still be formed therein. In addition, since this portion of the subframe is normally fabricated with openings to the exterior designed to receive the forklift Lines, suitable caps must be provided for closing off these forklift access points. For many ISO standard containers, these forklift covers may be designed to incorporate suitable coupling to ventilation pipes as, for example, described in my previous patents incorporated herein above by reference, and so may include pipe couplings or the like. Most preferably, caps having appropriate pipe couplings are provided with adequate gaskets to couple and seal the openings during bioconversion and Intermodal use, but which then also permit removal for those few times when forklift access is desired.

Figure 8:
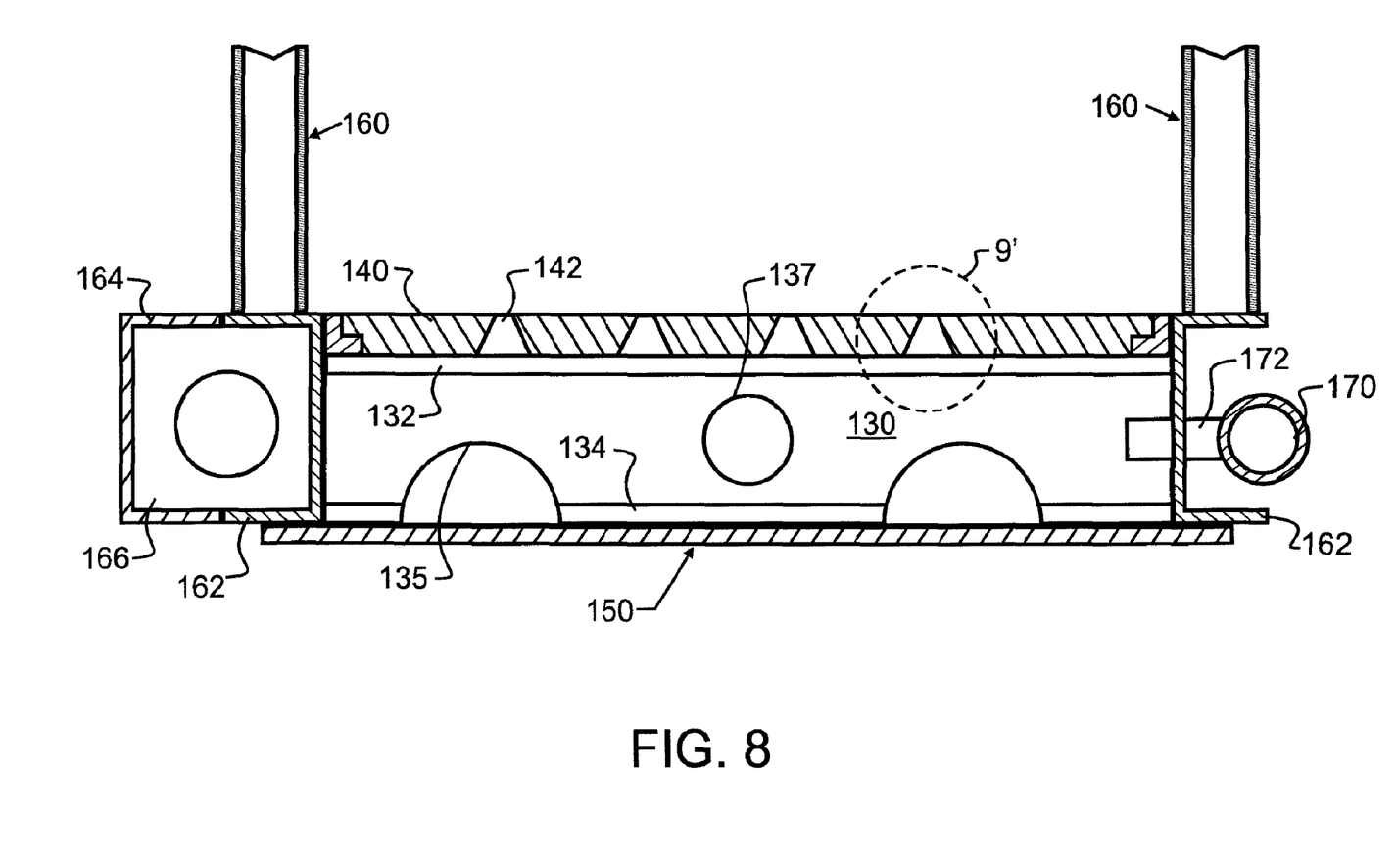
FIG. 8 illustrates a partial sectional view of a preferred combination Intermodal and bioconversion container designed in accord with the teachings of the present invention, and further illustrating two alternative methods of providing ventilation to the subchassis.

FIG. 8 illustrates the subchassis with proportionally enlarged ventilation features. There is no predetermined proportionate size for these features, and a designer will determine the most desirable proportions in accord with the flow of air or other gasses that will be required for a given application. In the most preferred embodiment, as little as two percent of the floor 140 is comprised by perforations 142. In contrast, many of the prior art bioconversion floors comprised more than thirty percent perforations or openings.

While a large number of couplings for ventilation holes 120 and drain holes 110 may be provided as illustrated in FIGS. 2 and 6, FIG. 8 illustrates two alternative methods for coupling to the various inlets and drain holes. In one embodiment, the ordinary C-channels 162 which terminate subframe 100 may simply be capped using an appropriately dimensioned C-channel 164 to form an enclosed rectangular conduit. An ordinary Intermodal container also includes couplings 166 at each corner that are preferably left undisturbed by the present invention. An additional closure for each end of the rectangular conduit formed by C-channels 162, 164 will then be provided, to form an enclosed air passage, to which at any one or more point, but at required at one point, the appropriate drain or inlet may be coupled. A second alternative coupling is provided by pipe 170, which is fabricated with appropriate coupling tubes 172 to pass into sub-frame 100. With the various coupling options, air can be delivered from sides or ends of the preferred embodiment containers.

Figure 9:
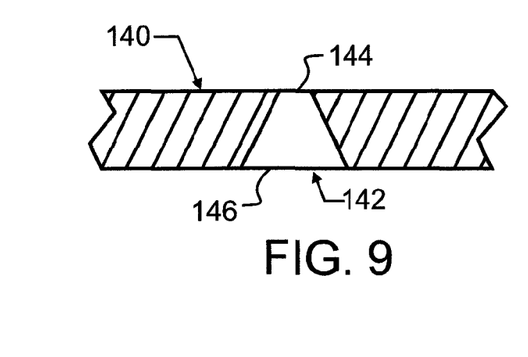
FIG. 9 illustrates a preferred embodiment self-cleaning hole designed in accord with the teachings of the present invention and used within the preferred floor panels illustrated in FIGS. 4-8, and specifically taken from enlarged sectional view 9' illustrated in FIG. 8.

FIG. 9, which is an enlarged sectional view taken from line 9' of FIG. 8, illustrates that the preferred embodiment incorporates, but is expressly not limited to, self-cleaning hole 142. As illustrated therein, floor 140 has perforation 142 formed therein. Adjacent the interior of the container, against which cargo or biomatter will rest, is the top side 144 of perforation 142. Distal thereto, and therefore not immediately supporting cargo or biomatter, is bottom side 146 of perforation 142. Most preferably, perforation 142 increases in diameter from top side 144 to bottom side 146. The purpose of this taper is to ensure that any matter which passes into perforation 142 will be more likely to not to get trapped therein and block the perforation, but instead be dropped through perforation 142 with reduced resistance. By making the taper gradual and consistent, there is little opportunity for matter to become lodged therein.

Figure 10:
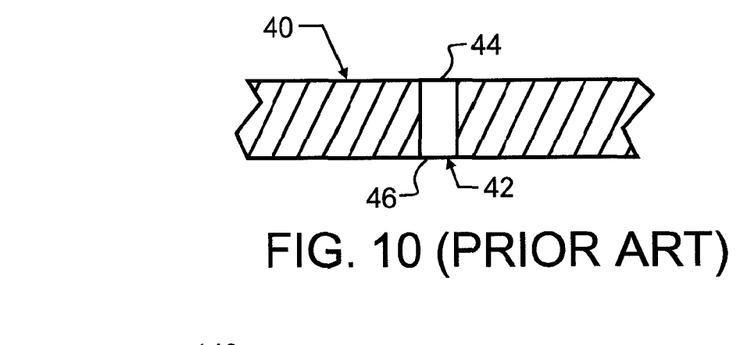
FIG. 10 illustrates a prior art perforation hole from enlarged sectional view comparable to that of FIG. 9.

While this taper is preferred to be a gradual and consistent taper as illustrated in FIG. 9, in some instances the fabrication of consistent dimensions may be more complex than a particular fabricator may prefer. This taper may alternatively be formed from a larger hole drilled partially from the bottom surface towards the top, and a smaller hole drilled partially from the top surface towards the bottom, such that the two holes overlap. Such fabrication results in a discontinuous or step-wise transition between smaller and larger diameters, but utilizes standard drill bits and is still more effective at reducing tendency for blockage of perforations 142 than a straight hole. The objective, regardless of the approach, is to ensure that the holes do not clog either when the container is filled with matter, or when vibrated and jolted during handling and transport. In contrast, FIG. 10 illustrates a prior art composting floor 40 which uses a hole 42 having equal diameter at both ends 44, 46. The prior art hole 42 is more prone to clogging, necessitating an increased percentage of perforations in floor 40 than required in floor 140.

When operated as a semi-solids bio-container, air is evenly distributed throughout the container, regardless of the size of the container. Improved air ducts and flow paths are provided, while the effects of shrinkage and channeling are reduced, through a strategically placed and relative percentage of openings through the floor. Further improvements in air distribution are achieved by an elimination or substantial reduction in percentage of opening through the floor as compared to conventional "punch plate" perforated metal or steel or plastic grates in areas immediately adjacent to the container side walls.

When operated as a primarily liquid-processing bio-container, such as a wastewater clarifier or biofilter, biofiltration media such as inert rocks, plastics, peat, activated carbon, cured compost or other semi-solid media can be placed over the perforated floor enabling water removal below. The perforated floor can also serve as a gravity separation tank, either as-is with the perforated floor, or in conjunction with removable filter fabric placed on top of the perforated floor. Thickened solids can subsequently be removed by dumping or by end-loader. In the water containment option, the gaskets of the container will be two-way seals, preventing water from leaking from the doors.

Bio-container walls must withstand a combination of corrosive by-products of bio-conversion and abrasion from diverse materials and articles during filling and emptying procedures. In addition, the corrugation of the existing container side walls may not facilitate emptying of the bio-container through dumping, requiring a smooth side wall. In accord with the present invention, the walls of the preferred embodiment will be smooth, corrosion resistant, and, for application in cooler climates or for maintenance of optimum temperatures, also be thermally insulated. They will preferably also be replaceable and reversible, such that extended life may be obtained from the initial wall materials. In one embodiment, clad panels with either foamed insulation polymer cores or polymer air-bubble cores are used to form the walls. In many cases, the existing epoxy coating and Cor-Ten™ steel walls may be sufficient corrosion or abrasion barriers.

Figures 11, 12:
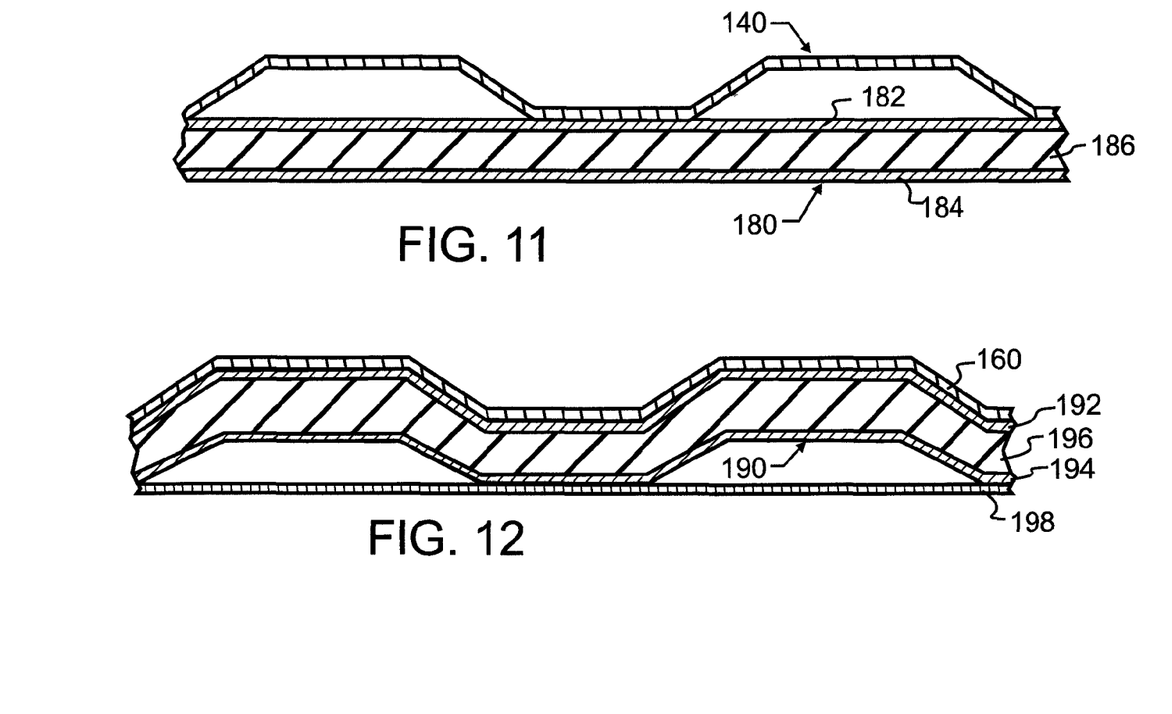

FIGS. 11 and 12 illustrate two alternative embodiment wall liner and insulation embodiments. Illustrated in FIG. 11 is an ordinary slightly corrugated Cor-Ten™ container wall, which is lined on the interior thereof with removable insulating liner 180. Liner 180 is most preferably a sandwich, having a foam or otherwise insulating core 186 and two faces 182, 184. Faces 182, 184 will most preferably be fabricated from coated, corrosion resistant steel, a sufficiently durable plastic, or other suitable material. Where the core 186 and faces 182, 184 are fabricated to form a single securely adhered laminate of suitable materials, the resulting liner 180 has substantial strength, which is required for this application as illustrated. During use, these liners tend to wear very unevenly, with the greatest wear and abrasion occurring within a container near to the floor and also adjacent the door. By making these liners removable, the liners may be reversed both front to back and top to bottom, and also inside out. The end result is a liner which lasts as much as four times as long as a prior art fixed liner.

FIG. 12 illustrates a second alternative embodiment wall liner and insulation. In this embodiment, wall 160 is directly overlaid with suitable insulation 190, which in this embodiment may preferably comprise aluminum foil 192, 194 clad on both sides of plastic bubble wrap 196, the product which is commonly sold as a building and construction insulation material. Since the resulting foil cladding 192, 194 is not sufficiently strong to withstand abrasion, a separate liner 198 must be provided. Once again, liner 198 may be removed and either rotated or replaced, as required.

Figure 13:
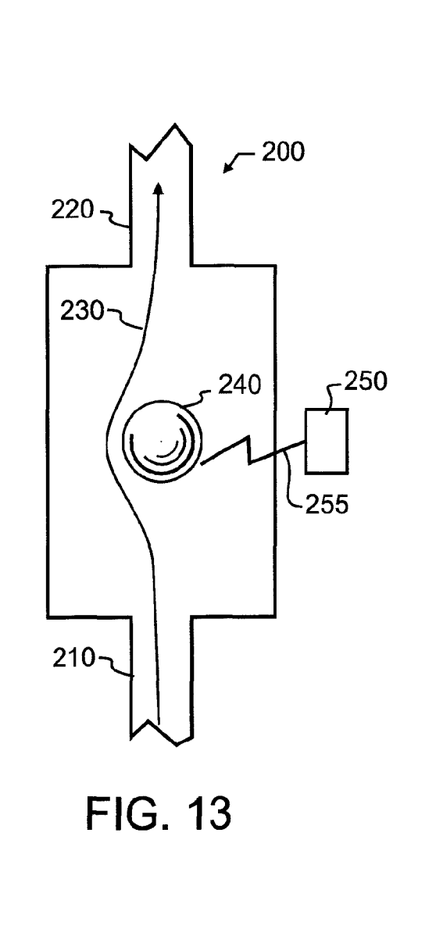
FIG. 13 illustrates a first embodiment check valve designed in accord with the teachings of the present invention, in an open state.
Figure 14:
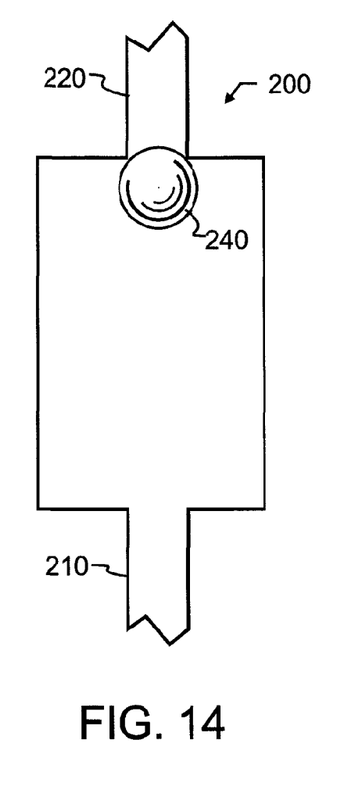
FIG. 14 illustrates the first embodiment check valve of FIG. 13 in a closed state.

Passive aeration through natural convection, even during shipping and transport of an active bioconversion container is contemplated. Where Intermodal flotation requirements must be met, check valves or the like may be provided within the air and drainage lines for flow control, and a fully powered blower system may be required. FIGS. 13 and 14 illustrate a first embodiment flow valve 200 suitable for use in such case in combination with the present apparatus illustrated in the prior figures. In this embodiment, an air or drain line has an inlet 210, an outlet 220, and a general flow direction illustrated by flow line 230. A ball 240 is free to move between inlet 210 and 220, and is acted on by flow 230 through friction and fluid drag, but is for exemplary purposes fabricated from a ferrous material An electromagnet 250 is provided adjacent to ball 240, such that forces of attraction 255 serve to maintain ball 240 generally centered within flow valve 200. In the event the Intermodal container is dropped or disconnected from a vessel, electromagnet 250 will lose power, and ball 240 will be carried by flow 230 into a position blocking outlet 220, effectively sealing the container as required by Intermodal specifications.

Figure 15:
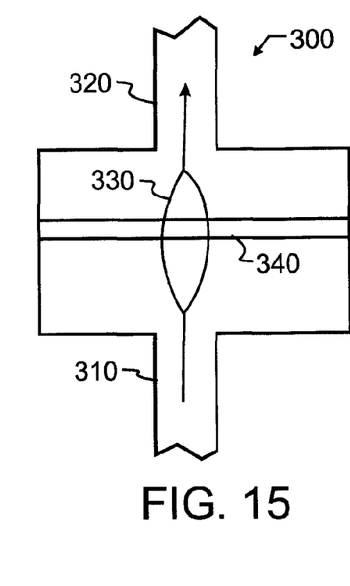
FIG. 15 illustrates a second embodiment check valve designed in accord with the teachings of the present invention.

A second alternative embodiment flow valve 300 is illustrated in FIG. 15. As shown therein, inlet 310 carries flow 330 through membrane 340 to outlet 320. Membrane 340 is most preferably a hydrophobic membrane which is also microporous. One exemplary material for membrane 340 is known commercially as Gore-Tex™, though there are many commercially available alternatives. These membranes are known to permit the flow of air, vapor and other gasses, while blocking the flow of liquids. In this way, air may be pumped through flow valve 300 while an Intermodal container designed in accord with the present teachings will remain water tight according to ISO specifications. As may be apparent from the disclosure herein of flow valves 200, 300, any known suitable liquid check valves may be used, and these embodiments are simply provided as two of many suitable means of illustrating how to provide aeration during bioconversion while still preserving the ISO required water-tight container.

Where only a curing cycle is required, and where the shipping duration is not too great, or if the container is used for fermentation or anaerobic digestion, oxygen demand may be low enough to not require additional ventilation and drainage. In such instances, either passive ventilation may be used or the container may be completely sealed. The floor design also facilitates temperature control, adding heat for anaerobic digestion, removing heat where necessary, and for the exchange of warm air from aerobic digestion to containers requiring heat such as anaerobic digestion.

Figure 16:
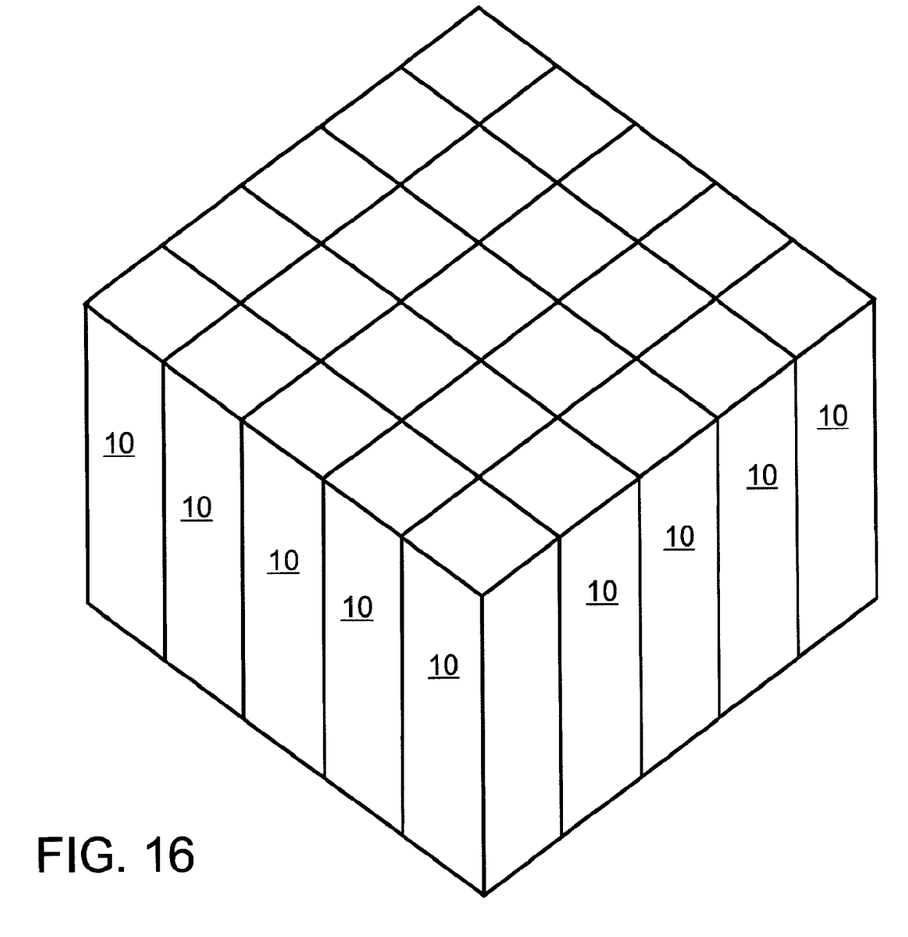
FIG. 16 illustrates an array of containers designed in accord with the teachings of the present invention from a projected view.

In one conceived application, containers designed in accord with the teachings of the present invention may be used as digestion or treatment tanks. Owing to the fully watertight constructions of the preferred embodiment, including the incorporation of sealed sub-floor 150 and a two-way water seal around the door, containers designed in accord with the teachings of the present invention may be used at any suitable angle of orientation. FIG. 16 illustrates an array of containers 10 placed on end. According to this concept, a large and indeterminate number of containers 10 are coupled together. In this case, the door and door gasket are located vertically in the air above the water containment line, and the container is used as a liquid holding tank. When placed on end, the application of interlocking Intermodal containers enables the entire bank of thus interlocked containers to achieve structural integrity by utilizing the mass and structure of the other containers to provide integrity through a flexible web, distributing weight over a greater surface area, and thereby enabling a virtually unlimited number of containers to be so integrated.

The preferred and alternative embodiments of the present invention may be manufactured from a variety of materials, including metals, resins and plastics, ceramics or cementitious materials, or even combinations of the above. The specific material used may vary, though special benefits are attainable if several important factors are taken into consideration. Firstly, weather and corrosion resistance are critical. The container and all components should be sufficiently durable to withstand the particular climate for the intended application, including any forces that may be applied that could tend to fracture any parts thereof. Simultaneously, the container should be resistant to all types of compounds to which the container will be exposed. By way of the present construction, and with appropriate materials and/or coalings, tire container interior, floor, subfloor, and beams will all be corrosion resistant, and the combination will be manufactured to be both water tight and air tight, to both contain leachate and condensate and also to ensure that ventilation gas is passed properly from inlet to outlet. Additionally, resistance to abrasion from sticks, rocks, and other materials commonly encountered is desirable. Finally, it is very preferable to use materials that are already in common use in the Intermodal container industry, or which may be readily adapted thereto, to maintain the desired compatibility with existing volume production of such containers.

The resulting containers meet the various international standards required for Intermodal shipping containers. Among these requirements is a requirement for sealing the container when submerged, and the internal dimensioning for standard loads.

One benefit of using this type of Intermodal container for bioconversion is that the contents, where applicable, may be undergoing bioconversion during transit to an intended destination. In the case of a typical composting process, the container may be filled and monitored according to prior art processes, and once a critical period for monitoring and control has passed, the container may then be shipped, with the shipping time serving not only to deliver the contents, but also to complete or further the bioconversion process. Anaerobic digestion may be a part of that bioconversion. As will be apparent, there is no additional loading or handling required of the contents, other than the loading of the container onto the vehicle or ship, and the total time required for use of the container has been reduced by using the shipping time for bioconversion. In some instances it may even be possible to equip a shipping vessel or vehicle with the controls and equipment to perform the entire bioconversion process, though in many cases the bioconversion time will be greater than the shipping time, making work with existing freight handling suitable for providing as great a time saving.

Another benefit of the present invention has not directly been discussed herein above. Not only will the present invention permit the container to be used for bioconversion while traveling to a destination, the present container may also simply be washed and then used for other cargo. Often times the transport of bioconversion products will be in one direction, from a source or processing facility to many other destinations. If the transport container is limited solely to bioconversion product, the cost of freight will not only include the shipment to the destination, but will also include the expense and time required to return the empty container to the source facility. By converting an Intermodal container into a container suitable for both bioconversion and shipping, while also preserving compliance with international standards for shipping containers, the present container may then be used not only for one way transport of bioconversion materials, but also for return shipment of other cargo. In accord with the teachings of the present invention, such conversion or OEM production may be achieved for far less capital than was heretofore required to convert the container into a single function bioconversion container.

While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims herein below.

I claim:

1. An Intermodal container defining an enclosed volume suitable for both shipping and bioconversion, comprising:
   a subchassis having a subframe defining a length, width and height, a top and bottom spaced by said height, ventilation and drainage holes passing through an exterior of said subframe, and beams extending laterally within said subframe across said width, said beams having holes through which ventilation and drainage may pass;
   a subfloor sealed with and adjacent said bottom of said subchassis; and
   a perforated floor adjacent said top of said subchassis and adjacent to said volume,
      wherein said perforated floor is generally planar and further comprises wood tiles in combination with separate plastic tiles, and wherein said wood flooring is immediately adjacent to container side walls, said container side walls at least partially defining said enclosed volume, said plastic flooring forming a scraping surface between said wood flooring and more distal to said container side walls than said wood flooring.

2. The Intermodal container suitable for both shipping and bioconversion of claim 1, wherein said drainage holes are immediately adjacent to said subfloor and are spaced from and distal to said perforated floor.

3. The Intermodal container suitable for both shipping and bioconversion of claim 1, wherein said wood flooring is solid and imperforate, and said plastic flooring perforate.

4. The Intermodal container suitable for both shipping and bioconversion of claim 1 wherein said plastic perforated flooring has a greater concentration of holes in a central region than adjacent container side walls, said container side walls at least partially defining said enclosed volume.

5. The Intermodal container suitable for both shipping and bioconversion of claim 1 wherein said perforate flooring comprises a plurality of perforation holes that each individually have a smaller opening adjacent said enclosed volume than an opening distal to said enclosed volume flooring having a smaller opening adjacent said enclosed biomatter than an opening distal to said enclosed biomatter.

6. The Intermodal container suitable for both shipping and bioconversion of claim 1 further comprising a ventilation system coupled with said subframe and further comprising at least one check valve within said ventilation system, said check valve operative to prevent ingress of water during transport while permitting air to flow through.

7. The Intermodal container suitable for both shipping and bioconversion of claim 1 wherein said perforated flooring further comprises a surface with sufficiently minor percent perforation to support a slurry for filtration, while similarly presenting a surface operative for scraping.

8. The Intermodal container suitable for both shipping and bioconversion of claim 1, further comprising replaceable smooth side walls within said enclosure.

9. The Intermodal container suitable for both shipping and bioconversion of claim 8 wherein said replaceable smooth side walls are fabricated from an insulating core sandwiched between two faces, each face sufficiently durable to face and contact said enclosed volume, said side walls rotatable about each axis for even wear during dumping.

10. The Intermodal container suitable for both shipping and bioconversion of claim 9 wherein said replaceable smooth side walls are fabricated from bubble-wrap insulation.

11. A bioconversion container forming an enclosed space containing organic matter therein, and having a floor adjacent said organic matter of generally planar plastic flooring perforated with a plurality of perforation holes that each individually taper from an opening size smaller adjacent to enclosed space containing said organic matter to an opening size larger more distal thereto, said perforated floor further generally planar and comprising exposed generally planar wood in combination with exposed generally planar plastic, wherein said wood flooring is immediately adjacent to container side walls, said container side walls at least partially defining said enclosed space, said plastic flooring forming a scraping surface between said wood flooring and more distal to said container side walls than said wood flooring.

12. The Intermodal container suitable for both shipping and bioconversion of claim 11, wherein said wood flooring is solid and imperforate, and said plastic flooring perforate.

13. The Intermodal container suitable for both shipping and bioconversion of claim 11 wherein said plastic perforated flooring has a greater concentration of holes in a central region than adjacent container side walls, said container side walls at least partially defining said enclosed space.

14. The Intermodal container suitable for both shipping and bioconversion of claim 11 further comprising a ventilation system coupled with said perforated floor and further comprising at least one check valve within said ventilation system, said check valve operative to prevent ingress of water during transport while permitting air to flow through.

15. The Intermodal container suitable for both shipping and bioconversion of claim 11 wherein said perforated flooring further comprises a generally planar surface with sufficiently minor percent perforation to support a slurry for filtration, while similarly presenting a surface operative for scraping.

16. A bioconversion container enclosing biomatter, said bioconversion container comprising replaceable smooth side walls immediately adjacent said biomatter and a generally planar perforated floor adjacent said biomatter, wherein said perforated floor further comprises wood in combination with a second perforate material comprising plastic or steel, wherein said wood flooring is immediately adjacent to said replaceable smooth side walls, said replaceable smooth side walls at least partially defining an enclosed volume, said second perforate material flooring forming a scraping surface between said wood flooring and more distal to said replaceable smooth side walls than said wood flooring.

17. The bioconversion container of claim 16, wherein said wood flooring is solid and imperforate, and said second perforate material comprises plastic flooring.

18. The bioconversion container of claim 16, wherein said perforated flooring has a greater concentration of holes in a central region than adjacent replaceable smooth side walls.

19. The bioconversion container of claim 16 wherein said perforate flooring has a plurality of perforation holes that each individually have a smaller opening adjacent said enclosed biomatter than an opening distal to said enclosed biomatter.

20. The bioconversion container of claim 16 further comprising a ventilation system coupled with said biomatter and further comprising at least one check valve within said ventilation system, said check valve operative to prevent ingress of water into said bioconversion container during transport while permitting air to flow through.

21. The bioconversion container of claim 16 wherein said perforate flooring has a planar surface with sufficiently minor percent perforation to support a slurry for filtration, while similarly presenting a surface operative for scraping.

* * * * *